June 3, 1924.

W. H. DAILEY

SAW

Filed Dec. 14, 1923

1,496,408

WITNESSES

Oliver W. Holmes

INVENTOR
WILLIAM H. DAILEY
BY
Weed & Gray
ATTORNEYS

Patented June 3, 1924.

1,496,408

UNITED STATES PATENT OFFICE.

WILLIAM H. DAILEY, OF BROOKLYN, NEW YORK.

SAW.

Application filed December 14, 1923. Serial No. 680,605.

*To all whom it may concern:*

Be it known that I, WILLIAM H. DAILEY, a citizen of the United States, residing at Brooklyn, in the county of Queens and State of New York, have invented certain new and useful Improvments in Saws, of which the following is a specification.

This invention relates to saws and more particularly to a saw comprising a pair of cutting blades adapted to be disposed in angular relation, an object of the invention being to provide an improved saw of this character wherein a miniature cutting blade or a blade of less length than the main blade is so connected thereto as to permit saw cuts to be made at various predetermined angles.

A further object of this invention is to provide an improved double blade saw comprising a main saw blade and a miniature or smaller saw blade hingedly connected thereto and adapted to be adjusted at different angles to the main blade so that after an initial saw cut has been made with the main blade the miniature blade may be utilized to make a preliminary angular saw cut at any desired angle to the main saw cut, after which the main saw blade may be readily inserted in the angular saw cut and operated for the purpose of completing the cut.

Figure 1:
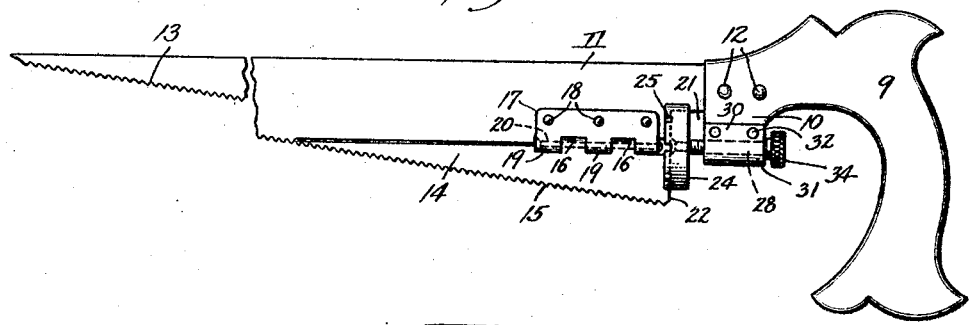
Figure 2:
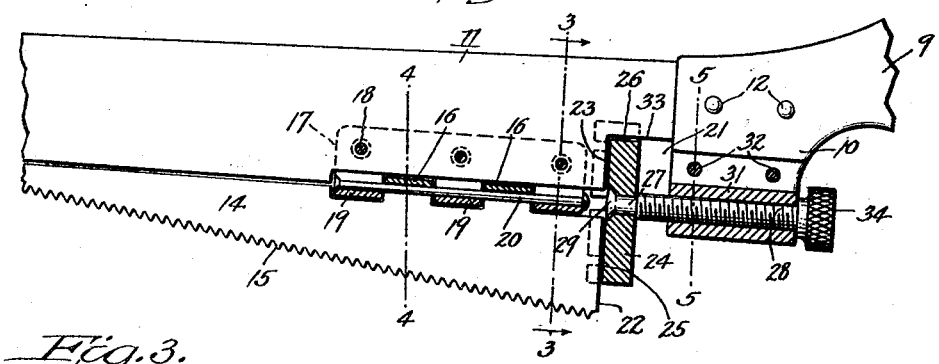
Figure 3:
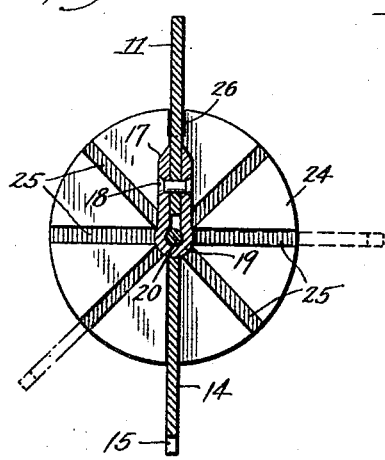
Figure 4:
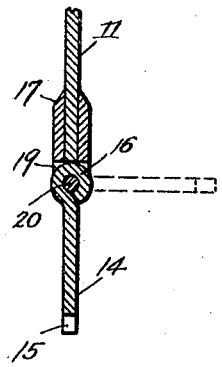
Figure 5:
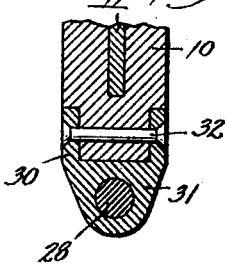

Other objects of this invention will appear in the following description and appended claims, reference being had to the accompaying drawings forming a part of this specification wherein like reference characters designate corresponding parts in the several views, and wherein Fig. 1 is a side view illustrating an embodiment of my invention; Fig. 2 is a fragmentary side view thereof partly in section; Fig. 3 is a cross section taken substantially on line 3—3 of Fig. 2 and in the direction of the arrows; Fig. 4 is a section taken on line 4—4 of Fig. 2 and Fig. 5 is a section taken on line 5—5 of Fig. 2.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

Heretofore in the construction of angular or double blade saws it has been the practice to provide a miniature or smaller saw blade which is formed from the main blade or attached thereto so as to be disposed at a fixed angle to the main blade. As a result of such construction it was only possible to utilize the supplementary angular blade for making a saw cut at a given angle to the main saw cut. Thus if the supplementary blade were positioned at right angles to the main blade it was possible for the user to make only a right angle saw cut with such blade. Hence, where the user found it necessary to make saw cuts at various angles he was obliged to provide himself with a large number of saws having angular blades located at the required angles. Moreover, where, as heretofore the angular saw blade extended from the main blade at a fixed angle thereto it frequently happened that during the normal use of the main cutting blade an excessive cutting stroke thereof would result in causing the point of the angular blade to strike the wood, thus damaging the blade.

The foregoing disadvantages in angular saws heretofore made have been eliminated by virtue of the present invention wherein the miniature blade is hingedly connected to the main blade adjacent to the handle of the saw so that the miniature blade can be adjusted at various angles to the main blade for the purpose of forming saw cuts at various angles. Means is also provided for the purpose of locking or maintaining the miniature blade in its different adjusted positions. In addition the present improved saw is so made that the miniature blade may be disposed in the plane of the main blade so that the cutting edges of both blades will extend substantially in prolongation, so that both blades may be utilized in making a straight saw cut.

In the drawings wherein I have illustrated a present preferred form of my invention it will be seen that the saw comprises a suitable handle 9 having a main saw blade 11 secured thereto in the usual manner as at 12 in Fig. 1. The cutting edge 13 of the main blade is preferably tapered from a point intermediate the ends of the blade to the forward end thereof. Rearwardly of the cutting edge 13 the main blade is provided with a straight horizontal edge to which is connected a miniature or supplementary blade 14. This blade is preferably triangular in shape and is provided with a cutting edge 15 which, when the blades 11 and 14 are located in the same plane, extends substantially in prolongation of the cutting edge 13. The upper edge of the blade 14 is provided at suitable intervals with spaced projections which are bent over or coiled to form hinge joints 16. A hinge member 17 is secured at 18 to the plate 11 and is provided with projecting portions 19 extending into recesses in the upper edge of the blade 14. A hinge pin 20 extends through the parts 16 and 19 thereby hingedly connecting the blades 14 and 11 together. The hinged member 17 is located a suitable distance in rear of the forward point of the blade 14 so as to enable this blade to cut to a suitable depth without interference with the hinge portions. Adjacent to the handle 9 the main blade 11 is cut away to provide a recess 21, and it will be seen that the rear edge 22 of the blade 14 terminates at the forward edge 23 of this recess. Within the recess 21 is housed a locking or clamping member 24, which in the present instance is in the form of a disk having the forward face thereof provided with radially extending grooves or slots 25. The grooves 25 are formed in pairs, one thereof extending diametrically opposite the other, and the disk 24 at the top thereof is also provided with a transverse groove or slot 26. The disk 24 is bored centrally thereof to receive the reduced end 27 of a screw 28. The forward end 29 of this screw is upset to provide a swivel head 29 housed in a notch in the disk 24, and from the foregoing construction it will be seen that the disk 24 forms with the screw 28 a swivel joint.

The handle 9 is cut away at opposite sides to receive upwardly extending flanges 30 of a sleeve 31, which is secured to the handle as at 32. The sleeve 31 is tapped lengthwise to provide threads adapted to cooperate with the threads of the screw 28, the latter having a knurled portion 34 for manipulating the screw.

From the foregoing it will be seen that by turning the knurled portion 34 the locking disk 24 will be shifted by means of the screw toward and from the edges 22 and 23 of the cutting blades. In the position shown in Fig. 1 where the blades 11 and 14 are positioned in the same plane the disk 24 is shifted forwardly so that the edges 22 and 23 of the blades will extend into diametrically located grooves 25 of the disk. It will be seen that the edge 33 of the main blade 11 will at all times extend into the slot 26 of the disk 24, this slot acting as a guide slot not only for preventing rotation of the disk but also for enabling a more rigid and firm locking connection to be provided between the two blades. When it is desired to position the blade 14 at any desired angle to the main blade it is merely necessary to rotate the screw 28 so as to shift the disk 24 rearwardly so as to free the edges 22 and 23 from the slots 25, as shown in Fig. 2. Whereupon the blade 14 may be swung relatively to the main blade 11 and positioned at the desired angle so that upon rotating the screw 28 in the opposite direction the disk 24 will slide forwardly so as to cause the edges 22 and 23 to be housed in angularly related slots 25.

From the foregoing it will be seen that I have provided a double blade saw which may be used for many different purposes, which is particularly advantageous in doing away with the necessity, as heretofore, of providing a separate saw for each angle desired to be cut, since the present saw may be utilized to cut any desired angle. It will be understood of course that the disk 24 may be provided with any suitable number of slots 25 for cutting the various angles required. Furthermore, it will be observed that the locking disk 24 by means of slots 25 and 26 is adapted to rigidly clamp the blades together in the desired relative positions thereof. The miniature or supplementary blade 15 may, when desired, be used in conjunction with the blade 13 to form a straight saw cut, the edges of the two blades in this instance extending in alinement. When however, the blade 14 is positioned at a predetermined angle to the main blade, it may be used, for instance, to form a preliminary saw cut joined to the main saw cut and at an angle thereto, after which the point of the main blade may be inserted in the preliminary cut and the main blade operated to complete the cut. Furthermore, it will be seen that the angular blade 14 may be used to start from the edge of the wood a saw cut at the desired angle.

It is to be understood that by describing in detail herein any particular form, structure or arrangement, it is not intended to limit the invention beyond the terms of the claims or the requirements of the prior art.

Having thus explained the nature of my said invention and described a way of constructing and using the same, although without attempting to set forth all of the forms in which it may be made, or all of the modes of its use, I claim:

1. A saw comprising a handle and a pair of angularly adjustable cutting blades supported thereby, said blades having each a tooth edge, one tooth edge in prolongation of the other.

2. A saw comprising a pair of blades having each a tooth edge extending one in prolongation of the other, and means for maintaining one of said blades in the same plane as the other, said means being shiftable to adjust one of said blades at an angle to the other.

3. A saw comprising a handle, a main cutting blade connected to said handle and a second cutting blade hinged to said main cutting blade, said blades having each a tooth edge extending one in prolongation of the other.

4. A saw comprising a handle, a main cutting blade connected to said handle, a second cutting blade, means for hinging said blades together, and means for releasably locking said blades at different angles one to the other, said blades having each a tooth edge extending one in prolongation of the other.

5. A saw comprising a main cutting blade, and a cutting blade of less length than said main blade hingedly connected thereto, said blades having each a tooth edge extending one in prolongation of the other.

6. A saw comprising a main cutting blade, a cutting blade of less length than said main blade hingedly connected thereto, and means for locking said blades together in relatively fixed position and also for releasing them, said blades having each a tooth edge extending one in prolongation of the other.

7. A saw comprising a handle, a main blade connected to said handle, a blade of less length than said main blade hinged thereto adjacent to said handle and adapted to be swung into angular position with respect to said main blade, and means for maintaining said blades in such angularly related position, said blades having each a tooth edge extending one in prolongation of the other.

8. A saw comprising a handle, a main blade connected thereto, a second blade connected to said main blade, means for maintaining said second blade at an angle to said main blade and also adapted to maintain the same in the plane of said main blade, said blades having each a tooth edge extending one in prolongation of the other.

9. A saw comprising a handle, a main blade connected thereto, a second blade connected to said main blade, means for maintaining said second blade at an angle to said main blade and also for maintaining said blades in the same plane, said blades having each a tooth edge extending one in prolongation of the other.

10. A saw comprising a handle, a main blade, a blade hinged to said main blade, and a shiftable member for locking said blades in relatively fixed position, said blades having each a tooth edge extending one in prolongation of the other.

11. A saw comprising a handle, a main blade, a blade hinged to said main blade, a shiftable locking member for locking said blades in relatively fixed position, and threaded means connected to said locking member for shifting the same, said blades having each a tooth edge extending one in prolongation of the other.

12. A saw comprising a handle, a main blade, a blade swingingly connected to said main blade, and shiftable means having a plurality of angularly related slots for positioning said blades in different angular relations, said blades having each a tooth edge extending one in prolongation of the other.

13. A saw comprising a handle, a main blade, a blade swingingly connected to said main blade, said blades having each a tooth edge extending one in prolongation of the other, a locking member having a plurality of angularly related slots, and means for shifting said member thereby to position said blades in certain of said slots, said last means comprising a screw connected to said locking member and supported by said handle.

14. A saw comprising a handle, a cutting blade connected to said handle, said handle and blade having one a recess adjacent to the juxtaposed ends thereof, a blade hinged to said first blade, said blades having each a tooth edge extending one in prolongation of the other, a shiftable member extending into said recess and having a plurality of angularly related slots, and means for shifting said member to cause said blades to be seated in certain of said slots.

Signed at Brooklyn, Queens County, New York, this 13th day of December, 1923.

WILLIAM H. DAILEY.